United States Patent
Boivin et al.

(10) Patent No.: US 10,577,476 B2
(45) Date of Patent: *Mar. 3, 2020

(54) METHOD FOR PREPARING PRECIPITATED SILICAS, NOVEL PRECIPITATED SILICAS AND THEIR USES, IN PARTICULAR FOR STRENGTHENING POLYMERS

(71) Applicant: RHODIA OPERATIONS, Paris (FR)

(72) Inventors: Cédric Boivin, Neuville sur Saone (FR); Laurent Guy, Rillieux-la-Pape (FR); Eric Perin, Villefranche sur Saone (FR); Kilani Lamiri, L'Arbresle (FR)

(73) Assignee: Rhodia Operations, Paris (FR)

( * ) Notice: Subject to any disclaimer, the term of this patent is extended or adjusted under 35 U.S.C. 154(b) by 393 days.

This patent is subject to a terminal disclaimer.

(21) Appl. No.: 14/424,353

(22) PCT Filed: Sep. 2, 2013

(86) PCT No.: PCT/EP2013/068104
§ 371 (c)(1),
(2) Date: Feb. 26, 2015

(87) PCT Pub. No.: WO2014/033300
PCT Pub. Date: Mar. 6, 2014

(65) Prior Publication Data
US 2015/0252172 A1  Sep. 10, 2015

(30) Foreign Application Priority Data
Aug. 31, 2012 (FR) ...................................... 1202348

(51) Int. Cl.
| | |
|---|---|
| C08K 3/36 | (2006.01) |
| C01B 33/193 | (2006.01) |
| C08K 3/22 | (2006.01) |
| C08K 5/092 | (2006.01) |
| C08K 5/548 | (2006.01) |
| C08L 9/06 | (2006.01) |
| C09C 1/30 | (2006.01) |
| C08K 5/1539 | (2006.01) |

(52) U.S. Cl.
CPC .............. *C08K 3/36* (2013.01); *C01B 33/193* (2013.01); *C08K 3/22* (2013.01); *C08K 5/092* (2013.01); *C08K 5/1539* (2013.01); *C08K 5/548* (2013.01); *C08L 9/06* (2013.01); *C09C 1/30* (2013.01); *C09C 1/3063* (2013.01); *C01P 2006/12* (2013.01); *C01P 2006/19* (2013.01); *C08K 2003/2227* (2013.01); *C08L 2205/02* (2013.01)

(58) Field of Classification Search
CPC . C08K 3/36; C08K 3/22; C08K 5/092; C08K 5/1539; C08K 5/548; C08K 2003/2227; C01B 33/193; C08L 9/06; C08L 2205/02; C09C 1/30; C09C 1/3063; C01P 2006/12; C01P 2006/19
USPC ......................................................... 524/493
See application file for complete search history.

(56) References Cited

U.S. PATENT DOCUMENTS

| | | | |
|---|---|---|---|
| 4,174,301 A * | 11/1979 | Choca ........................ | B01J 2/20 502/263 |
| 5,800,608 A | 9/1998 | Bomal et al. | |
| 5,852,099 A | 12/1998 | Vanel | |
| 5,876,494 A | 3/1999 | Bomal et al. | |
| 2004/0079504 A1 | 4/2004 | Lafon et al. | |
| 2009/0214449 A1 | 8/2009 | Valero et al. | |

FOREIGN PATENT DOCUMENTS

| | | |
|---|---|---|
| EP | 0735088 A1 | 10/1996 |
| EP | 1674520 A1 | 6/2006 |
| FR | 2863914 A1 | 6/2005 |
| FR | 2886285 A1 | 12/2006 |
| WO | 96/030303 A1 | 10/1996 |
| WO | 02/051750 A1 | 7/2002 |

OTHER PUBLICATIONS

Brunauer, Stephen, et al—"Adsorption of Gases in Multimolecular Layers", 1938 (Feb.), The Journal of American Chemical Society, vol. 60, pp. 309-319
Dorris, Gilles M., et al—"Adsorption of n-Alkanes at Zero Surface Coverage on Cellulose Paper and Wood Fibers", 1980, Journal of Colloid and Interface Science, vol. 77, No. 2, pp. 353-362.

* cited by examiner

*Primary Examiner* — Ling Siu Choi
*Assistant Examiner* — Ronald Grinsted

(57) ABSTRACT

The invention relates to a novel process for the preparation of a precipitated silica, in which:
  a silicate is reacted with an acidifying agent, so as to obtain a suspension of precipitated silica,
  said suspension of precipitated silica is filtered, so as to obtain a filtration cake,
  said filtration cake is subjected to a liquefaction operation comprising the addition of an aluminum compound,
  after the liquefaction operation, a drying stage is carried out,
characterized in that a mixture of polycarboxylic acids is added to the filtration cake, during or after the liquefaction operation.
It also relates to novel precipitated silicas and to their uses.

21 Claims, No Drawings

METHOD FOR PREPARING PRECIPITATED SILICAS, NOVEL PRECIPITATED SILICAS AND THEIR USES, IN PARTICULAR FOR STRENGTHENING POLYMERS

CROSS-REFERENCE TO RELATED APPLICATIONS

The present application is a U.S. national stage entry under 35 U.S.C. § 371 of International Application No. PCT/EP2013/068104filed Sep. 2, 2013, which claims priority to French Application No. 1202348 filed on Aug. 31, 2012. The entire contents of these applications are explicitly incorporated herein by this reference.

The present invention relates to a novel process for the preparation of precipitated silica, to novel precipitated silicas and to their applications, such as It is known to employ reinforcing white fillers in polymers, in particular elastomers, such as, for example, precipitated silica.

The aim of the present invention is to provide in particular an alternative filler for polymer compositions which advantageously provides them with a reduction in their viscosity and an improvement in their dynamic properties, while retaining their mechanical properties. It thus advantageously makes possible an improvement in the hysteresis/reinforcement compromise.

The present invention first of all provides a novel process for the preparation of precipitated silica employing, during or after the liquefaction operation, a mixture of polycarboxylic acids.

Generally, the preparation of precipitated silica is carried out by a precipitation reaction of a silicate, such as an alkali metal silicate (for example sodium silicate), with an acidifying agent (for example sulfuric acid), then separation by filtration, with a filtration cake being obtained, of the precipitated silica obtained, subsequently disintegrating said filtration cake and, finally, drying (generally by atomization). The silica can be precipitated in any mode: in particular, addition of acidifying agent to a silicate vessel heel or total or partial simultaneous addition of acidifying agent and of silicate to a vessel heel of water or of silicate.

One of the subject matters of the invention is a novel process for the preparation of a precipitated silica, in which:
  at least one silicate is reacted with at least one acidifying agent, so as to obtain a suspension of precipitated silica,
  the suspension of precipitated silica obtained is filtered, so as to obtain a filtration cake,
  the filtration cake obtained on conclusion of the filtration is subjected to a liquefaction operation comprising the addition of an aluminum compound,
  after the liquefaction operation, a drying stage is preferably carried out (generally by atomization),
characterized in that a mixture of polycarboxylic acids is added to the filtration cake, during or after the liquefaction operation.

According to the invention, the filtration cake is subjected to a liquefaction operation during which an aluminum compound and a mixture of polycarboxylic acids are introduced or after which a mixture of polycarboxylic acids is introduced. The mixture then obtained (suspension of precipitated silica) is preferably subsequently dried (generally by atomization).

The liquefaction operation is a fluidification or liquefaction operation, in which the filtration cake is rendered liquid, the precipitated silica being re-encountered in suspension.

In two first alternative forms of the invention, this liquefaction operation is carried out by subjecting the filtration cake to a chemical action by addition of an aluminum compound, for example sodium aluminate, and of a mixture of polycarboxylic acids, preferably coupled with a mechanical action (for example, by passing through a continuously stirred tank or through a mill of colloid type) which normally brings about a reduction in particle size of the suspended silica. The suspension (in particular aqueous suspension) obtained after liquefaction exhibits a relatively low viscosity.

In the first alternative form, during the liquefaction operation, the aluminum compound and the mixture of polycarboxylic acids are simultaneously added (coaddition) to the filtration cake.

In the second alternative form, during the liquefaction operation, the aluminum compound is added to the filtration cake prior to the addition of the mixture of polycarboxylic acids.

In a third alternative form, this liquefaction operation is carried out by subjecting the filtration cake to a chemical action by addition of an aluminum compound, for example sodium aluminate, preferably coupled with a mechanical action (for example, by passing through a continuously stirred tank or through a mill of colloid type) which normally brings about a reduction in particle size of the suspended silica.

In this third alternative form, a mixture of polycarboxylic acids is added after the liquefaction operation, that is to say, to the disintegrated silica cake.

The filtration cake which has to be subjected to the liquefaction operation can be composed of the mixture of several filtration cakes, each of said cakes being obtained by filtration of a portion of the suspension of precipitated silica obtained above.

According to the invention, the mixture of polycarboxylic acids is preferably a mixture of dicarboxylic and/or tricarboxylic acids, in particular a mixture of at least two, preferably of at least three, dicarboxylic and/or tricarboxylic acids, especially a mixture of three dicarboxylic and/or tricarboxylic acids.

Preferably, the dicarboxylic and tricarboxylic acids are chosen from adipic acid, succinic acid, ethylsuccinic acid, glutaric acid, methylglutaric acid, oxalic acid or citric acid.

Preferably, the mixture of polycarboxylic acids is a mixture of dicarboxylic acids, in particular a mixture of at least three dicarboxylic acids, especially a mixture of three dicarboxylic acids.

According to a preferred alternative form of the invention, the mixture of polycarboxylic acids used in the invention comprises the following acids: adipic acid, glutaric acid and succinic acid. For example, the mixture of polycarboxylic acids comprises from 15% to 35% by weight of adipic acid, from 40% to 60% by weight of glutaric acid and from 15% to 25% by weight of succinic acid.

The mixture of polycarboxylic acids according to this preferred alternative form of the invention can result from a process for the manufacture of adipic acid.

According to another preferred alternative form of the invention, the mixture of polycarboxylic acids used in the invention comprises the following acids: methylglutaric acid, ethylsuccinic acid and adipic acid. For example, the mixture of polycarboxylic acids comprises from 60% to 96% by weight of methylglutaric acid, from 3.9% to 20% by weight of ethylsuccinic acid and from 0.05% to 20% by weight of adipic acid.

Likewise, the mixture of polycarboxylic acids according to this preferred alternative form of the invention can result from a process for the manufacture of adipic acid.

Advantageously, the mixture of polycarboxylic acids according to this preferred alternative form of the invention can be obtained by acid hydrolysis, preferably by basic hydrolysis, of a mixture of methylglutaronitrile, ethylsuccinonitrile and adiponitrile resulting from the process for the manufacture of adiponitrile by hydrocyanation of butadiene, adiponitrile being an important intermediate in the synthesis of hexamethylenediamine.

A portion or all of the polycarboxylic acids, in particular of the dicarboxylic and/or tricarboxylic acids, of the mixture employed according to the invention can be in the anhydride, ester, alkali metal (for example sodium or potassium) salt (carboxylate) or ammonium salt (carboxylate) form.

For example, the mixture of polycarboxylic acids can be a mixture comprising:
methylglutaric acid (in particular from 60% to 96% by weight, for example from 90% to 95.5% by weight),
ethylsuccinic anhydride (in particular from 3.9% to 20% by weight, for example from 3.9% to 9.7% by weight),
adipic acid (in particular from 0.05% to 20% by weight, for example from 0.1% to 0.3% by weight).

The mixture of polycarboxylic acids can also be a mixture comprising:
methylglutaric acid (in particular from 10% to 50% by weight, for example from 25% to 40% by weight),
methylglutaric anhydride (in particular from 40% to 80% by weight, for example from 55% to 70% by weight),
ethylsuccinic anhydride (in particular from 3.9% to 20% by weight, for example from 3.9% to 9.7%),
adipic acid (in particular from 0.05% to 20% by weight, for example from 0.1% to 0.3% by weight).

The mixtures used according to the invention can optionally comprise impurities.

The polycarboxylic acids used in the invention can optionally be preneutralized (in particular by pretreating them with a base, for example of sodium hydroxide or potassium hydroxide type) before they are added to the filtration cake. This makes it possible in particular to modify the pH of the silica obtained.

The polycarboxylic acids can be employed in the form of an aqueous solution.

Preferably, the aluminum compound is chosen from alkali metal aluminates. In particular, the aluminum compound is sodium aluminate.

According to the invention, the amount of aluminum compound (in particular sodium aluminate) used is generally such that the ratio of aluminum compound to amount of silica, expressed as $SiO_2$, present in the filtration cake is between 0.20% and 0.50% by weight, preferably between 0.25% and 0.45% by weight.

The amount of mixture of polycarboxylic acids employed is in general such that the ratio of mixture of polycarboxylic acids to amount of silica, expressed as $SiO_2$, present in the filtration cake (at the time of the addition of the mixture of polycarboxylic acids) is between 0.75% and 2% by weight, preferably between 1% and 1.75% by weight, in particular between 1.1% and 1.5% by weight.

In the invention, the filtration cake can optionally be washed.

The precipitated silica thus obtained after the liquefaction operation is subsequently dried. This drying operation can be carried out by any means known per se.

Preferably, the drying operation is carried out by atomization. To this end, use may be made of any type of suitable atomizer, in particular a rotary, nozzle, liquid pressure or two-fluid atomizer. In general, when the filtration is carried out using a filter press, a nozzle atomizer is used and, when the filtration is carried out using a vacuum filter, a rotary atomizer is used.

When the drying operation is carried out using a nozzle atomizer, the precipitated silica capable of then being obtained usually exists in the form of substantially spherical beads.

On conclusion of this drying operation, it is optionally possible to carry out a stage of milling the product recovered; the precipitated silica capable of then being obtained generally exists in the form of a powder.

When the drying operation is carried out using a rotary atomizer, the silica capable of then being obtained can exist in the form of a powder.

Finally, the product, dried (in particular by a rotary atomizer) or milled as indicated above, can optionally be subjected to an agglomeration stage which comprises, for example, a direct compression, a wet granulation (that is to say, with the use of a binder, such as water, silica suspension, and the like), an extrusion or, preferably, a dry compacting. When the latter technique is employed, it can prove to be opportune, before carrying out the compacting, to deaerate (operation also referred to as predensifying or degassing) the pulverulent products so as to remove the air included in the latter and to provide more uniform compacting.

The precipitated silica capable of then being obtained by this agglomeration stage generally exists in the form of granules.

Another subject matter of the present invention is a specific process for the preparation of a precipitated silica of the type comprising the precipitation reaction between a silicate and an acidifying agent, whereby a suspension of precipitated silica is obtained, followed by the separation and the drying of this suspension, characterized in that it comprises the following successive stages:
the precipitation reaction is carried out in the following way:
(i) an initial vessel heel comprising at least a portion of the total amount of the silicate involved in the reaction and an electrolyte is formed, the concentration of silicate (expressed as $SiO_2$) in said initial vessel heel being less than 100 g/l and, preferably, the concentration of electrolyte in said initial vessel heel being less than 19 g/l,
(ii) the acidifying agent is added to said vessel heel until a pH value for the reaction medium of at least 7.0, in particular of between 7 and 8.5, is obtained,
(iii) acidifying agent and, if appropriate, simultaneously the remaining amount of silicate is/are added to the reaction medium,
the silica suspension obtained is filtered,
the filtration cake obtained on conclusion of the filtration is subjected to a liquefaction operation comprising the addition of an aluminum compound,
the filtration cake thus obtained, preferably exhibiting a solids content of at most 25% by weight, is dried,
said process being characterized in that a mixture of polycarboxylic acids is added to the filtration cake, either during the liquefaction operation, or after the liquefaction operation and before the drying stage.

That which is indicated in the above account on the subject of the liquefaction operation, of the addition of the mixture of carboxylic acids and of the three alternative forms of the process applies to the present process according to the invention.

The choice of the acidifying agent and of the silicate is made in a way well known per se.

Use is generally made, as acidifying agent, of a strong inorganic acid, such as sulfuric acid, nitric acid or hydrochloric acid, or also of an organic acid, such as acetic acid, formic acid or carbonic acid.

The acidifying agent can be dilute or concentrated; its normality can be between 0.4 and 36N, for example between 0.6 and 1.5N.

In particular, in the case where the acidifying agent is sulfuric acid, its concentration can be between 40 and 180 g/l, for example between 60 and 130 g/l.

Use may be made, as silicate, of any common form of silicates, such as metasilicates, disilicates and advantageously an alkali metal silicate, in particular sodium or potassium silicate.

The silicate can exhibit a concentration (expressed as $SiO_2$) of between 40 and 330 g/l, for example between 60 and 300 g/l.

Preferably, use is made, as silicate, of sodium silicate.

In the case where use is made of sodium silicate, the latter generally exhibits an $SiO_2/Na_2O$ ratio by weight of between 2 and 4, in particular between 2.4 and 3.9, for example between 3.1 and 3.8.

During stage (i), a vessel heel is formed which comprises silicate and an electrolyte. The amount of silicate present in the initial vessel heel advantageously represents only a portion of the total amount of silicate involved in the reaction.

As regards the electrolyte present in the initial vessel heel (stage (i)), this term is understood here as normally accepted, that is to say that it means any ionic or molecular substance which, when it is in solution, decomposes or dissociates to form ions or charged particles; mention may be made, as electrolyte, of a salt of the group of the alkali metals and alkaline earth metals, in particular the salt of the starting silicate metal and of the acidifying agent, for example sodium chloride in the case of the reaction of a sodium silicate with hydrochloric acid or, preferably, sodium sulfate in the case of the reaction of a sodium silicate with sulfuric acid.

According to one characteristic of this preparation process, the concentration of electrolyte in the initial vessel heel is less than 19 g/l, in particular less than 18 g/l, especially less than 17 g/l, for example less than 15 g/l (while generally being greater than 6 g/l).

According to another characteristic of this process, the concentration of silicate (expressed as $SiO_2$) in the initial vessel heel is less than 100 g/l. Preferably, this concentration is less than 80 g/l, in particular less than 70 g/l. In particular, when the acid used for the neutralization exhibits a high concentration, in particular of greater than 70%, it is then advisable to work with an initial vessel heel of silicate, the $SiO_2$ concentration of which is less than 80 g/l.

The addition of acidifying agent in stage (ii) leads to a correlating fall in the pH of the reaction medium and is carried out until a value for the pH of the reaction medium of at least 7, in particular of between 7 and 8.5, for example of between 7.5 and 8.5, is reached.

Once the desired pH value has been reached, and in the case of a starting vessel heel comprising only a portion of the total amount of the silicate involved, a simultaneous addition of acidifying agent and of the remaining amount of silicate is then advantageously carried out in stage (iii).

This simultaneous addition is generally carried out in such a way that the value of the pH of the reaction medium is always equal (to within ±0.1) to that reached on conclusion of stage (ii).

On conclusion of stage (iii) and in particular after the abovementioned simultaneous addition, a maturing of the reaction medium (aqueous suspension) obtained can be carried out, at the pH obtained on conclusion of stage (iii), in general with stirring, for example for 2 to 45 minutes, in particular for 3 to 30 minutes.

Finally, it is possible, both in the case of a starting vessel heel comprising only a portion of the total amount of silicate involved and in the case of a starting vessel heel comprising the total amount of silicate involved, after the precipitation, in an optional subsequent stage, to add an additional amount of acidifying agent to the reaction medium. This addition is generally carried out until a pH value of between 3 and 6.5, preferably between 4 and 6.5, is obtained.

The temperature of the reaction medium is generally between 75 and 97° C., preferably between 80 and 96° C.

According to an alternative form of this preparation process, the reaction is carried out at a constant temperature of between 75 and 97° C. According to another alternative form of this process, the temperature at the end of the reaction is higher than the temperature at the start of the reaction: thus, the temperature at the start of the reaction is preferably maintained between 75 and 90° C.; then, the temperature is increased in a few minutes, preferably up to a value of between 90 and 97° C., at which it is maintained until the end of the reaction.

On conclusion of the stages which have just been described, a silica slurry is obtained, which slurry is subsequently separated (liquid/solid separation). This separation normally comprises a filtration, followed, if necessary, by a washing operation, carried out by means of any suitable method, for example by means of a belt filter, a vacuum filter or, preferably, a filter press.

The filtration cake is then subjected to a liquefaction operation comprising the addition of an aluminum compound. In accordance with the above account, a mixture of polycarboxylic acids is added during or after the liquefaction operation.

The disintegrated filtration cake is subsequently dried.

Preferably, in this preparation process, the suspension of precipitated silica obtained after the liquefaction operation should exhibit, immediately before it is dried, a solids content of at most 25% by weight, in particular of at most 24% by weight, especially of at most 23% by weight, for example of at most 22% by weight.

This drying operation can be carried out according to any means known per se. Preferably, the drying operation is carried out by atomization. To this end, use may be made of any type of suitable atomizer, in particular a rotary, nozzle, liquid pressure or two-fluid atomizer. In general, when the filtration is carried out using a filter press, a nozzle atomizer is used and, when the filtration is carried out using a vacuum filter, a rotary atomizer is used.

When the drying operation is carried out using a nozzle atomizer, the precipitated silica capable of then being obtained usually exists in the form of substantially spherical beads. On conclusion of this drying operation, it is optionally possible to carry out a stage of milling the product recovered; the precipitated silica capable of then being obtained generally exists in the form of a powder.

When the drying operation is carried out using a rotary atomizer, the precipitated silica capable of then being obtained can exist in the form of a powder.

Finally, the dried (in particular by a rotary atomizer) or milled product as indicated above can optionally be subjected to an agglomeration stage, which consists, for example, of a direct compression, a wet granulation (that is to say, with use of a binder, such as water, silica suspension, and the like), an extrusion or, preferably, a dry compacting. When the latter technique is employed, it can prove to be opportune, before carrying out the compacting, to deaerate (operation also referred to as predensifying or degassing) the pulverulent products so as to remove the air included in the latter and to provide more uniform compacting.

The precipitated silica capable of then being obtained by this agglomeration stage generally exists in the form of granules.

The invention also relates to the precipitated silicas obtained or capable of being obtained by the process according to the invention.

In general, these precipitated silicas exhibit, at their surface, molecules of the polycarboxylic acids employed and/or of the carboxylates corresponding to the polycarboxylic acids employed.

An additional subject matter of the present invention is a precipitated silica with the specific characteristics, which can be used in particular as alternative filler for polymer compositions, advantageously providing them with a reduction in their viscosity and an improvement in their dynamic properties, while retaining their mechanical properties.

In the account which follows, the BET specific surface is determined according to the Brunauer-Emmett-Teller method described in The Journal of the American Chemical Society, Vol. 60, page 309, February 1938, and corresponding to the standard NF ISO 5794-1, Appendix D (June 2010). The CTAB specific surface is the external surface, which can be determined according to the standard NF ISO 5794-1, Appendix G (June 2010).

The content of polycarboxylic acid+corresponding carboxylate denoted (C), expressed as total carbon, can be measured using a carbon/sulfur analyzer, such as the Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron). The analysis lasts approximately 1 minute.

The carbon present in the sample to be analyzed (weight of approximately 0.2 gram) combines with the oxygen to form $CO_2$, $CO$. These decompression gases are subsequently analyzed by an infrared detector.

The moisture from the sample and the water produced during these oxidation reactions is removed by passing over a cartridge comprising a dehydrating agent (magnesium perchlorate) in order not to interfere with the infrared measurement.

The result is expressed as percentage by weight of element carbon.

The content of aluminum, denoted (Al), can be determined by wavelength dispersive X-ray fluorescence, for example with a Panalytical 2400 spectrometer or, preferably, with a Panalytical MagixPro PW2540 spectrometer. The principle of the method of measurement by X-ray fluorescence is as follows:

grinding of the silica is necessary when it is provided in the form of substantially spherical beads (microbeads) or of granules, until a homogeneous powder is obtained. The grinding can be carried out with an agate mortar (grinding 15 grams of silica approximately for a time of 2 minutes) or any type of grinder not comprising aluminum, the powder is analyzed as is in a vessel having a diameter of 40 mm with a polypropylene film with a thickness of 6 µm, under a helium atmosphere, at an irradiation diameter of 37 mm, and the amount of silica analyzed is 9 $cm^3$. The measurement of the aluminum content, which requires at most 5 minutes, is obtained from the $K\alpha$ line ($2\theta$ angle=145°, PE002 crystal, 550 µm collimator, gas flow detector, rhodium tube, 32 kV and 125 mA). The intensity of this line is proportional to the aluminum content. It is possible to employ a precalibration carried out using another measurement method, such as ICP-AES (Inductively Coupled Plasma-Atomic Emission Spectroscopy).

The aluminum content can also be measured by any other suitable method, for example by ICP-AES after dissolving in water in the presence of hydrofluoric acid.

The presence of polycarboxylic acid(s) in the acid form and/or in the carboxylate form can be established by surface infrared or diamond-ATR (Attenuated Total Reflection) Infrared.

The surface infrared analysis (by transmission) is carried out on a Bruker Equinox 55 spectrometer on a pellet of pure product. The pellet is obtained after grinding the silica as is in an agate mortar and pelleting at 2 $T/cm^2$ for 10 seconds. The diameter of the pellet is 17 mm. The weight of the pellet is between 10 and 20 mg. The pellet thus obtained is placed in the high vacuum chamber ($10^{-7}$ mbar) of the spectrometer for one hour at ambient temperature before the analysis by transmission. Acquisition takes place under high vacuum (acquisition conditions: from 400 $cm^{-1}$ to 6000 $cm^{-1}$; number of scans: 100; resolution: 2 $cm^{-1}$).

The diamond-ATR analysis, carried out on a Bruker Tensor 27 spectrometer, consists in depositing, on the diamond, a spatula tip of silica preground in an agate mortar and in then exerting a pressure. The infrared spectrum is recorded on the spectrometer in 20 scans, from 650 $cm^{-1}$ to 4000 $cm^{-1}$. The resolution is 4 $cm^{-1}$.

The ratio denoted (R) is determined by the following relationship:

$$(R) = N \times \frac{[(100 \times (C)/C_T) \times M_{Al}]}{((Al) \times M_{Ac})},$$

in which:

N is the mean number of carboxylic functional groups per polycarboxylic acid (for example, if all the polycarboxylic acids are dicarboxylic acids (respectively tricarboxylic acids), N is equal to 2 (respectively to 3)), (C) and (Al) are the contents as defined above, $C_T$ is the carbon content of the polycarboxylic acids, $M_{Al}$ is the molecular weight of aluminum, $M_{Ac}$ is the molecular weight of the polycarboxylic acids.

The dispersive component of the surface energy $\gamma_s^d$ is determined by inverse gas chromatography. Grinding of the silica is generally necessary when it is provided in the form of granules, followed by sieving, for example at 106 µm-250 µm.

The technique used to calculate the dispersive component of the surface energy $\gamma_s^d$ is Inverse Gas Chromatography at Infinite Dilution (IGC-ID) at 110° C. using a series of alkanes (normal alkanes) ranging from 6 to 10 carbon atoms, a technique based on gas chromatography but where the roles of the mobile phase and of the stationary phase (packing) are reversed. In this instance, the stationary phase in the column is replaced by the (solid) material to be analyzed, in this instance the precipitated silica. With regard to the mobile phase, it consists of the carrier gas (helium) and of the "probe" molecules chosen as a function of their interaction capability. The measurements are successively carried out with each probe molecule. For each measurement, each probe molecule is injected into the column, in a very small amount (infinite dilution), as a mixture with methane. The methane is used to determine the t0, the dead time of the column.

The subtraction of this dead time t0 from the retention time of the injected probe results in the net retention time ($t_N$) of the latter.

These operating conditions, specific to the infinite dilution, mean that these retention times reflect solely the interactivity of the sample with regard to these molecules. Physically, $t_N$ corresponds to the mean time which the probe molecule has spent in contact with the stationary phase (the solid analyzed). For each probe molecule injected, three net retention times $t_N$ are measured. The mean value and the corresponding standard deviation are used to determine the specific retention volumes ($V_g^0$) on the basis of the following relationship (formula [1]).

$$V_g^0 = \frac{D_c t_N}{M_S} \times \frac{273.15}{T} \quad \text{formula [1]}$$

The latter corresponds to the volume of carrier gas (brought back to 0° C.) necessary to elute the probe molecule per 1 gram of stationary phase (solid examined). This standard quantity makes it possible to compare the results, whatever the flow rate of carrier gas and the weight of stationary phase used. The formula [1] involves: $M_s$ the weight of solid in the column, $D_c$ the flow rate of carrier gas and T the measurement temperature.

The specific retention volume is subsequently used to access $\Delta G_a$, the variation in free enthalpy of adsorption of the probe, according to the formula [2], with R the universal ideal gas constant (R=8.314 J.K$^{-1}$.mol$^{-1}$), on the solid present in the column.

$$\Delta G_a = RT \cdot \text{Ln}(V_g^0) \quad \text{formula [2]}$$

This quantity $\Delta G_a$ is the starting point for the determination of the dispersive component of the surface energy ($\gamma_s^d$). The latter is obtained by plotting the straight line representing the variation in free enthalpy of adsorption ($\Delta G_a$) as a function of the carbon number $n_c$ of the n-alkane probes, as shown in the table below.

| n-Alkane probes | $n_c$ |
|---|---|
| n-hexane | 6 |
| n-heptane | 7 |
| n-octane | 8 |
| n-nonane | 9 |
| n-decane | 10 |

It is then possible to determine the dispersive component of the surface energy $\gamma_s^d$ from the slope $\Delta G_a^{CH_2}$ of the straight line of the normal alkanes, corresponding to the free enthalpy of adsorption of the methylene group, obtained for a measurement temperature of 110° C.

The dispersive component of the surface energy $\gamma_s^d$ is then related to the free enthalpy of adsorption $\Delta G_a^{CH_2}$ of the methylene group (Dorris and Gray method, *J. Colloid Interface Sci.*, 77 (180), 353-362) by the following relationship:

$$\gamma_S^d = \frac{(\Delta G_a^{CH_2})^2}{4 N_A^2 \cdot a_{CH_2}^2 \cdot \gamma_{CH_2}}$$

in which $N_A$ is Avogadro's number (6.02×10$^{23}$ mol$^{-1}$), $a_{CH_2}$ is the area occupied by an adsorbed methylene group (0.06 nm$^2$) and $\gamma_{CH_2}$ is the surface energy of a solid consisting solely of methylene group and determined on polyethylene (35.6 mJ/m$^2$ at 20° C.).

The coordination number of the aluminum is determined by solid aluminum NMR.

The technique used to measure the water uptake consists generally in placing the predried silica sample under given relative humidity conditions for a predetermined time; the silica then hydrates, which causes the weight of the sample to change from an initial value w (in the dried state) to a final value w+dw. "Water uptake" of a silica specifically denotes, in particular throughout the continuation of the account, the dw/w ratio (that is to say, the weight of water incorporated in the sample with respect to the weight of the sample in the dry state), expressed as percentage, calculated for a silica sample subjected to the following conditions during the measurement method:

preliminary drying: 8 hours, at 150° C.;
hydration: 24 hours, at 20° C., and under a relative humidity of 70%.

The experimental protocol employed consists in successively:

precisely weighing approximately 2 grams of the silica to be tested;
drying, for 8 hours, the silica thus weighed out in an oven adjusted to a temperature of 105° C.;
determining the weight w of the silica obtained on conclusion of this drying operation;
placing, for 24 hours, at 20° C., the dried silica in a closed container, such as a desiccator, comprising a water/glycerol mixture, so that the relative humidity of the closed medium is 70%;
determining the weight (w+dw) of the silica obtained subsequent to this treatment at 70% relative humidity for 24 hours, the measurement of this weight being carried out immediately after having removed the silica from the desiccator, so as to prevent variation in the weight of the silica under the influence of the change in hygrometry between the medium at 70% relative humidity and the atmosphere of the laboratory.

The pore volumes and pore diameters are measured by mercury (Hg) porosimetry using a Micromeritics Autopore 9520 porosimeter and are calculated by the Washburn relationship with a contact angle theta equal to 130° and a surface tension gamma equal to 484 dynes/cm (standard DIN 66133). The preparation of each sample is carried out as follows: each sample is predried in an oven at 200° C. for 2 hours.

The ability of the silicas to disperse and to deagglomerate can be quantified by means of the specific deagglomeration test below.

A particle size measurement is carried out (by laser diffraction) on a suspension of silica deagglomerated beforehand by ultrasonication; the ability of the silica to deagglomerate (cleavage of the objects from 0.1 to several tens of microns) is thus measured. The deagglomeration under ultrasound is carried out using a Vibracell Bioblock (600 W) sonicator equipped with a probe having a diameter of 19 mm. The particle size measurement is carried out by laser diffraction on a Sympatec Helios/BF particle sizer (equipped with an optical lens of R3 (0.9-175 µm) type), employing the Fraunhofer theory.

2 grams (+/−0.1 gram) of silica are introduced into a 50 ml beaker (height: 7.5 cm and diameter: 4.5 cm) and the weight is made up to 50 grams by addition of 48 grams (+/−0.1 gram) of deionized water. A 4% aqueous silica suspension is thus obtained.

The deagglomeration under ultrasound is subsequently carried out as follows: the "TIMER" button of the sonicator is pressed and the time is adjusted to 5 minutes 30 seconds. The amplitude of the probe (corresponding to the nominal power) is adjusted to 80% and then the ultrasound probe is immersed over 5 centimeters in the silica suspension present in the beaker. The ultrasound probe is then switched on and the deagglomeration is carried out for 5 minutes 30 seconds at 80% amplitude of the probe.

The particle size measurement is subsequently carried out by introducing, into the vessel of the particle sizer, a volume V (expressed in ml) of the suspension, this volume V being such that 8% optical density is achieved on the particle sizer.

The median diameter $Ø_{50}$, after deagglomeration with ultrasound, is such that 50% of the particles by volume have a size of less than $Ø_{50}$ and 50% have a size of greater than $Ø_{50}$. The value of the median diameter $Ø_{50}$ which is obtained decreases in proportion as the ability of the silica to deagglomerate increases.

It is also possible to determine the ratio (10×V/optical density of the suspension detected by the particle sizer), this optical density corresponding to the true value detected by the particle sizer during the introduction of the silica.

This ratio (deagglomeration factor $F_D$) is indicative of the content of particles with a size of less than 0.1 µm which are not detected by the particle sizer. This ratio increases in proportion as the ability of the silica to deagglomerate increases.

The pH is measured according to the following method deriving from the standard ISO 787/9 (pH of a 5% suspension in water):

Equipment:
calibrated pH meter (accuracy of reading to $1/100^{th}$)
combined glass electrode
200 ml beaker
100 ml measuring cylinder
balance accurate to within about 0.01 g.

Procedure:
5 grams of silica are weighed to within about 0.01 gram into the 200 ml beaker. 95 ml of water, measured from the graduated measuring cylinder, are subsequently added to the silica powder. The suspension thus obtained is vigorously stirred (magnetic stirring) for 10 minutes. The pH measurement is then carried out.

The precipitated silica according to the invention is characterized in that it has:
a BET specific surface of between 45 and 550 m²/g, in particular between 70 and 370 m²/g, especially between 80 and 300 m²/g,
a content (C) of polycarboxylic acid+corresponding carboxylate, expressed as total carbon, of at least 0.15% by weight, in particular of at least 0.20% by weight,
an aluminum (Al) content of at least 0.20% by weight, in particular of at least 0.25% by weight.

The precipitated silica according to the invention can in particular exhibit a BET specific surface of between 100 and 240 m²/g, in particular between 120 and 190 m²/g, for example between 130 and 170 m²/g.

The precipitated silica according to the invention can in particular exhibit a content (C) of polycarboxylic acid+corresponding carboxylate, expressed as total carbon, of at least 0.25% by weight, in particular of at least 0.30% by weight, for example of at least 0.35% by weight, indeed even of at least 0.45% by weight.

The precipitated silica in accordance with the invention can in particular exhibit an aluminum (Al) content of at least 0.30% by weight, in particular of at least 0.33% by weight. It generally exhibits an aluminum (Al) content of less than 1% by weight, in particular of at most 0.50% by weight, for example of at most 0.45% by weight.

The presence of the polycarboxylic acids and/or of the carboxylates corresponding to the polycarboxylic acids at the surface of the silica according to the invention can be illustrated by the presence of shoulders characteristic of the C—O and C=O bonds, visible on the infrared spectra, obtained in particular by surface (transmission) infrared or diamond-ATR infrared (in particular between 1540 and 1590 cm⁻¹ and between 1380 and 1420 cm⁻¹ for C—O, and between 1700 and 1750 cm⁻¹ for C=O).

In general, the precipitated silica according to the invention exhibits, at its surface, molecules of the polycarboxylic acids of the abovementioned mixtures and/or of the carboxylates corresponding to the polycarboxylic acids of the abovementioned mixtures.

For example, it can exhibit, at its surface:
molecules of adipic acid in the acid form and/or in the carboxylate form,
and
molecules of glutaric acid in the acid form and/or in the carboxylate form,
and
molecules of succinic acid in the acid form and/or in the carboxylate form.

For example, it can exhibit, at its surface:
molecules of methylglutaric acid in the acid form and/or in the carboxylate form,
and
molecules of ethylsuccinic acid in the acid form and/or in the carboxylate form,
and
molecules of adipic acid in the acid form and/or in the carboxylate form.

In general, the precipitated silica according to the invention has a CTAB specific surface of between 40 and 525 m²/g, in particular between 70 and 350 m²/g, especially between 80 and 310 m²/g, for example between 100 and 240 m²/g. It can in particular be between 130 and 200 m²/g, for example between 140 and 190 m²/g.

In general, the precipitated silica according to the invention exhibits a BET specific surface/CTAB specific surface ratio of between 0.9 and 1.2, that is to say that it exhibits a low microporosity.

Preferably, the precipitated silica according to the invention has a ratio (R) between 0.4 and 3.5, in particular between 0.4 and 2.5. This ratio (R) can also be between 0.5 and 3.5, in particular between 0.5 and 2.5, especially between 0.5 and 2, for example between 0.8 and 2, indeed even between 0.8 and 1.8, or between 0.8 and 1.6.

Preferably, the precipitated silica according to the invention exhibits a dispersive component of the surface energy $\gamma_s^d$ of less than 43 mJ/m², in particular of less than 42 mJ/m².

It can exhibit a dispersive component of the surface energy $\gamma_s^d$ of at least 40 mJ/m$^2$ and of less than 43 mJ/m$^2$, in particular of strictly between 40 and 43 mJ/m$^2$, for example of strictly between 40 and 42 mJ/m$^2$.

Preferably, it exhibits a dispersive component of the surface energy $\gamma_s^d$ of less than 40 mJ/m$^2$, in particular of less than 35 mJ/m$^2$.

In addition, the precipitated silica according to the invention can have a specific distribution of the coordination number of the aluminum, determined by solid aluminum NMR. In general, at most 85% by number, in particular at most 80% by number, in particular between 70% and 85% by number, for example between 70% and 80% by number, of the aluminum atoms of the silica according to the invention can exhibit a tetrahedral coordination number, that is to say, can be in a tetrahedral site. In particular, between 15% and 30% by number, for example between 20% and 30% by number, of the aluminum atoms of the silica according to the invention can exhibit a pentahedral or octahedral coordination number, that is to say, can be in a pentahedral or octahedral site.

The precipitated silica according to the invention can exhibit a water uptake of greater than 6%, in particular of greater than 7%, especially of greater than 7.5%, for example of greater than 8%, indeed even of greater than 8.5%.

In general, the precipitated silica according to the invention exhibits a high ability to disperse (in particular in elastomers) and to deagglomerate.

The precipitated silica according to the invention can exhibit a diameter $\varnothing_{50}$, after deagglomeration with ultrasound, of at most 5 µm, preferably of at most 4 µm, in particular of between 3.5 and 2.5 µm.

The precipitated silica according to the invention can exhibit an ultrasound deagglomeration factor $F_D$ of greater than 5.5 ml, in particular of greater than 7.5 ml, for example of greater than 12 ml.

Another parameter of the precipitated silica according to the invention can lie in the distribution of its pore volume and in particular in the distribution of the pore volume which is generated by the pores having diameters of less than or equal to 400 Å. The latter volume corresponds to the useful pore volume of the fillers employed in the reinforcement of elastomers. In general, the analysis of the porograms shows that this silica, equally well in the form of substantially spherical beads (microbeads), of powder or of granules, preferably has a pore distribution such that the pore volume generated by the pores having a diameter of between 175 and 275 Å (V2) represents at least 50%, in particular at least 55%, especially between 55% and 65%, for example between 55% and 60%, of the pore volume generated by the pores with diameters of less than or equal to 400 Å (V1). When the precipitated silica according to the invention is provided in the form of granules, it can optionally have a pore distribution such that the pore volume generated by the pores having a diameter of between 175 and 275 Å (V2) represents at least 60% of the pore volume generated by the pores with diameters of less than or equal to 400 Å (V1).

The precipitated silica according to the invention preferably exhibits a pH of between 3.5 and 7.5, more preferably still between 4 and 7, in particular between 4.5 and 6.

The precipitated silica according to the invention can be provided in any physical state, that is to say that it can be provided in the form of substantially spherical beads (microbeads), of a powder or of granules.

It can thus be provided in the form of substantially spherical beads with a mean size of at least 80 µm, preferably of at least 150 µm, in particular of between 150 and 270 µm; this mean size is determined according to the standard NF X 11507 (December 1970) by dry sieving and determination of the diameter corresponding to a cumulative oversize of 50%.

It can also be provided in the form of a powder with a mean size of at least 3 µm, in particular of at least 10 µm, preferably of at least 15 µm.

It can be provided in the form of granules (generally of substantially parallelepipedal shape) with a size of at least 1 mm, for example of between 1 and 10 mm, in particular along the axis of their greatest dimension.

The silica according to the invention is preferably obtained by the process described above, in particular the specific preparation process.

Advantageously, the precipitated silicas according to the present invention or (capable of being) obtained by the process according to the invention described above confer, on the polymeric (elastomeric) compositions into which they are introduced, a highly satisfactory compromise in properties, in particular a reduction in their viscosity and preferably an improvement in their dynamic properties, while retaining their mechanical properties. They thus advantageously make possible an improvement in the processing/reinforcement/hysteresis properties compromise. Preferably, they exhibit a good ability to disperse and to deagglomerate in polymeric (elastomeric) compositions.

The precipitated silicas according to the present invention or (capable of being) obtained by the process described above according to the invention can be used in numerous applications.

They can be employed, for example, as catalyst support, as absorbent for active materials (in particular support for liquids, especially used in food, such as vitamins (vitamin E) or choline chloride), in polymer, especially elastomer, or silicone compositions, as viscosifying, texturizing or anti-caking agent, as battery separator component, or as additive for toothpaste, concrete or paper.

However, they find a particularly advantageous application in the reinforcement of natural or synthetic polymers.

The polymer compositions in which they can be employed, in particular as reinforcing filler, are generally based on one or more polymers or copolymers (especially bipolymers or terpolymers), in particular on one or more elastomers, preferably exhibiting at least one glass transition temperature of between −150° C. and +300° C., for example between −150° C. and +20° C.

Mention may in particular be made, as possible polymers, of diene polymers, in particular diene elastomers.

For example, use may be made of polymers or copolymers (in particular bipolymers or terpolymers) deriving from aliphatic or aromatic monomers, comprising at least one unsaturation (such as, in particular, ethylene, propylene, butadiene, isoprene, styrene, acrylonitrile, isobutylene or vinyl acetate), polybutyl acrylate, or their mixtures; mention may also be made of silicone elastomers, functionalized elastomers, for example functionalized by chemical groups positioned along the macromolecular chain and/or at one or more of its ends (for example by functional groups capable of reacting with the surface of the silica), and halogenated polymers. Mention may be made of polyamides.

The polymer (copolymer) can be a bulk polymer (copolymer), a polymer (copolymer) latex or else a solution of polymer (copolymer) in water or in any other appropriate dispersing liquid.

Mention may be made, as diene elastomers, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur (vulcanisates are then obtained) or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Use may in particular be made, as coupling agents, as nonlimiting examples, of "symmetrical" or "unsymmetrical" silane polysulfides; mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer.

It can also be employed in the free state (that is to say, not grafted beforehand) or grafted at the surface of the silica. It is the same for the optional covering agent.

The coupling agent can optionally be combined with an appropriate "coupling activator", that is to say a compound which, mixed with this coupling agent, increases the effectiveness of the latter.

The proportion by weight of silica in the polymer composition can vary within a fairly wide range. It normally represents from 10% to 200%, in particular from 20% to 150%, especially from 20% to 80% (for example from 30% to 70%) or from 80% to 120% (for example from 90% to 110%), of the amount of the polymer(s).

The silica according to the invention can advantageously constitute all of the reinforcing inorganic filler and even all of the reinforcing filler of the polymer composition.

However, this silica according to the invention can optionally be combined with at least one other reinforcing filler, such as, in particular, a commercial highly dispersible silica, such as, for example, Z1165MP or Z1115MP, a treated precipitated silica (for example, a precipitated silica "doped" using a cation, such as aluminum); another reinforcing inorganic filler, such as, for example, alumina, indeed even a reinforcing organic filler, in particular carbon black (optionally covered with an inorganic layer, for example of silica). The silica according to the invention then preferably constitutes at least 50% by weight, indeed even at least 80% by weight, of all of the reinforcing filler.

Mention may be made, as nonlimiting examples of finished articles comprising at least one of (in particular based on) said polymer compositions described above (in particular based on the abovementioned vulcanisates), of footwear soles (preferably in the presence of a (silica/polymer) coupling agent, for example triethoxysilylpropyl tetrasulfide), floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires, in particular tire treads (especially for light vehicles or for heavy-goods vehicles (for example trucks)).

The following examples illustrate the invention without, however, limiting the scope thereof.

EXAMPLES

Example 1

The suspension of precipitated silica used is a silica slurry obtained on conclusion of the precipitation reaction during the process for the preparation of the Z1165MP silica.

The silica suspension (1396 liters) is filtered and washed on a filter press and is then subjected to compacting at a pressure of 5.5 bar on the same filter. The silica cake which results therefrom exhibits a solids content of 23% by weight.

Prior to the liquefaction operation, a 100 g/l solution of AGS (mixture of adipic acid, glutaric acid and succinic acid) is prepared by dissolving AGS flakes (26% by weight of adipic acid, 52% by weight of glutaric acid, 21% by weight of succinic acid and 1% of others) in water (at 35° C.) with stirring.

The cake obtained in the filtration stage is subjected to a liquefaction operation in a continuous vigorously stirred reactor (for approximately 3 hours) with simultaneous addition to the cake of 2270 grams of a sodium aluminate solution (Al/$SiO_2$ ratio by weight of 0.33%) and of 10 557 grams of the 100 g/l AGS solution (AGS/$SiO_2$ ratio by weight of 1.1%).

This disintegrated cake (having a solids content of 22% by weight) is subsequently dried using a nozzle atomizer by spraying the disintegrated cake through a 1.5 mm nozzle with a pressure of 25 bar under the following mean conditions of flow rate and of temperatures:

Mean inlet temperature: 558° C.

Mean outlet temperature: 157° C.

Mean flow rate: 214 l/h.

The characteristics of the silica S1 obtained (in the form of substantially spherical beads) are then the following:

| | |
|---|---|
| BET ($m^2$/g) | 147 |
| Content of polycarboxylic acid + carboxylate (C) (%) | 0.35 |
| Aluminum (Al) content (%) | 0.33 |
| Ratio (R) | 1.0 |
| CTAB ($m^2$/g) | 155 |
| $\gamma_s^d$ (mJ/$m^2$) | 32.9 |
| $\varnothing_{50}$ (μm) after deagglomeration with ultrasound | 2.8 |
| Fd after deagglomeration with ultrasound | 14.0 |
| V2/V1 (%) | 62 |
| pH | 5.8 |

Example 2

The elastomeric compositions, the make up of which, expressed as parts by weight per 100 parts of elastomers (phr), is shown in table I below, are prepared in an internal mixer of Brabender type (380 ml):

TABLE I

| Composition | Control 1 | Composition 1 |
|---|---|---|
| SBR (1) | 103 | 103 |
| BR (1) | 25 | 25 |
| Silica 1 (2) | 80 | |
| Silica S1 (3) | | 80 |
| Coupling agent (4) | 6.4 | 6.4 |
| Carbon black (N330) | 3.0 | 3.0 |
| Plasticizer (5) | 7 | 7 |
| ZnO | 2.5 | 2.5 |
| Stearic acid | 2 | 2 |
| Antioxidant (6) | 1.9 | 1.9 |
| DPG (7) | 1.5 | 1.5 |
| CBS (8) | 2 | 2 |
| Sulfur | 1.1 | 1.1 |

(1) Solution SBR (Buna VSL5025-2 from Lanxess) with 50 +/− 4% of vinyl units; 25 +/− 2% of styrene units; Tg in the vicinity of −20° C.; 100 phr of SBR extended with 37.5 +/− 2.8% by weight of oil/BR (Buna CB 25 from Lanxess)
(2) Silica Z1165 MP from Rhodia
(3) Silica S1 according to the present invention (liquefaction with simultaneous addition of sodium aluminate and of a mixture of AGS (Adipic-Glutaric-Succinic) acids (example 1 above))
(4) TESPT (Luvomaxx TESPT from Lehvoss France sarl)
(5) Nytex 4700 from Nynas
(6) N-(1,3-Dimethylbutyl)-N-phenyl-para-phenylenediamine (Santoflex 6-PPD from Flexsys)
(7) Diphenylguanidine (Rhenogran DPG-80 from RheinChemie)
(8) N-Cyclohexyl-2-benzothiazolesulfenamide (Rhenogran CBS-80 from RheinChemie)

The silica Z1165 MP exhibits the following characteristics:

| | |
|---|---|
| BET (m$^2$/g) | 161 |
| Content of polycarboxylic acid + carboxylate (C) (%) | 0.00 |
| Aluminum (Al) content (%) | 0.30 |
| Ratio (R) | 0 |
| CTAB (m$^2$/g) | 155 |
| $\gamma_s^d$ (mJ/m$^2$) | 48.7 |
| Water uptake (%) | 9.4 |

Process for the Preparation of the Elastomeric Compositions:

The process for the preparation of the rubber compositions is carried out in two successive preparation phases. A first phase consists of a phase of high-temperature thermomechanical working. It is followed by a second phase of mechanical working at temperatures of less than 110° C. This phase makes possible the introduction of the vulcanization system.

The first phase is carried out using a mixing device, of internal mixer type, of Brabender brand (capacity of 380 ml). The filling coefficient is 0.6. The initial temperature and the speed of the rotors are set on each occasion so as to achieve mixture dropping temperatures of approximately 140-160° C.

Broken down here into two passes, the first phase makes it possible to incorporate, in a first pass, the elastomers and then the reinforcing filler (introduction in installments) with the coupling agent and the stearic acid. For this pass, the duration is between 4 and 10 minutes.

After cooling the mixture (temperature of less than 100° C.), a second pass makes it possible to incorporate the zinc oxide and the protecting agents/antioxidants (in particular 6-PPD). The duration of this pass is between 2 and 5 minutes.

After cooling the mixture (temperature of less than 100° C.), the second phase makes possible the introduction of the vulcanization system (sulfur and accelerators, such as CBS). It is carried out on an open mill, preheated to 50° C. The duration of this phase is between 2 and 6 minutes.

Each final mixture is subsequently calandered in the form of plaques with a thickness of 2-3 mm.

With regard to these "raw" mixtures obtained, an evaluation of their rheological properties makes it possible to optimize the vulcanization time and the vulcanization temperature.

Subsequently, the mechanical and dynamic properties of the mixtures vulcanized at the curing optimum (T98) are measured.

Rheological Properties

Viscosity of the Raw Mixtures:

The Mooney consistency is measured on the compositions in the raw state at 100° C. using an MV 2000 rheometer and also the determination of the Mooney stress-relaxation rate according to the standard NF ISO 289.

The value of the torque, read at the end of 4 minutes after preheating for one minute (Mooney Large (1+4)—at 100° C.), is shown in table II. The test is carried out after preparing the raw mixtures and then after aging for 3 weeks at a temperature of 23+/−3° C.

TABLE II

| References | | Control 1 | Composition 1 |
|---|---|---|---|
| ML (1 + 4) - 100° C. | Initial | 79 | 71 |
| Mooney relaxation | Initial | 0.312 | 0.339 |
| ML (1 + 4) - 100° C. | After 3 weeks (23 +/− 3° C.) | 93 | 77 |
| Mooney relaxation | After 3 weeks (23 +/− 3° C.) | 0.258 | 0.309 |

It is found that the silica S1 of the present invention (Composition 1) makes possible a sizable reduction in the initial raw viscosity, with respect to the value of the mixture with the reference (Control 1).

It is also found that the silica S1 of the present invention (Composition 1) makes it possible to retain the advantage in reduced raw viscosity, with respect to the value of the mixture with the reference (Control 1), after 3 weeks of storage.

This type of behavior over time is of great use to a person skilled in the art in the case of the processing of silica-comprising rubber mixtures.

Rheometry of the Compositions:

The measurements are carried out on the compositions in the raw state. The results relating to the rheology test, which is carried out at 160° C. using a Monsanto ODR rheometer according to the standard NF ISO 3417, have been given in table III.

According to this test, the test composition is placed in the test chamber regulated at the temperature of 160° C. for 30 minutes, and the resistive torque opposed by the composition to a low-amplitude (3°) oscillation of a biconical rotor included in the test chamber is measured, the composition completely filling the chamber under consideration.

The following are determined from the curve of variation in the torque as a function of time:
  the minimum torque (Tmin), which reflects the viscosity of the composition at the temperature under consideration;
  the maximum torque (Tmax);
  the delta torque ($\Delta T=Tmax-Tmin$), which reflects the degree of crosslinking brought about by the action of the crosslinking system and, if the need arises, of the coupling agents;

the time T98 necessary to obtain a vulcanization state corresponding to 98% of complete vulcanization (this time is taken as vulcanization optimum);

and the scorch time TS2, corresponding to the time necessary in order to have a rise of 2 points above the minimum torque at the temperature under consideration (160° C.) and which reflects the time during which it is possible to process the raw mixtures at this temperature without having initiation of vulcanization (the mixture cures from TS2).

The results obtained are shown in table III.

TABLE III

| Compositions | Control 1 | Composition 1 |
|---|---|---|
| Tmin (dN · m) | 17.0 | 15.5 |
| Tmax (dN · m) | 56.0 | 61.7 |
| Delta torque (dN · m) | 39.0 | 46.2 |
| TS2 (min) | 5.8 | 6.9 |
| T98 (min) | 26.2 | 26.6 |

The use of the silica S1 of the present invention (Composition 1) makes it possible to reduce the minimum viscosity (sign of an improvement in the raw viscosity) with respect to the reference (Control 1) without damaging the vulcanization behavior.

Mechanical Properties of the Vulcanisates:

The measurements are carried out on the optimally vulcanized compositions (T98) for a temperature of 160° C.

Uniaxial tensile tests are carried out in accordance with the instructions of the standard NF ISO 37 with test specimens of H2 type at a rate of 500 mm/min on an Instron 5564 device. The x % moduli, corresponding to the stress measured at x % of tensile strain, are expressed in MPa. It is possible to determine a reinforcing index (RI) which is equal to the ratio of the modulus at 300% strain to the modulus at 100% strain.

The Shore A hardness measurement on the vulcanisates is carried out according to the instructions of the standard ASTM D 2240. The given value is measured at 15 seconds.

The properties measured are collated in table IV.

TABLE IV

| Compositions | Control 1 | Composition 1 |
|---|---|---|
| 10% Modulus (MPa) | 0.6 | 0.6 |
| 100% Modulus (MPa) | 2.1 | 2.3 |
| 300% Modulus (MPa) | 11.6 | 13.4 |
| RI | 5.6 | 5.8 |
| Shore A hardness - 15 s (pts) | 55 | 55 |

It is found that the composition resulting from the invention (Composition 1) exhibits a good compromise in mechanical properties, with respect to what is obtained with the control composition.

Composition 1 thus exhibits relatively low 10% and 100% moduli and a relatively high 300% modulus, hence a greater reinforcing index.

The use of a silica S1 of the present invention (Composition 1) makes it possible to obtain a satisfactory level of reinforcement, with respect to the reference (Control 1).

Dynamic Properties of the Vulcanisates:

The dynamic properties are measured on a viscosity analyser (Metravib VA3000) according to the standard ASTM D5992.

The values for loss factor (tan δ) and compressive dynamic complex modulus (E*) are recorded on vulcanized samples (cylindrical test specimen with a cross section of 95 mm$^2$ and a height of 14 mm). The sample is subjected at the start to a 10% prestrain and then to a sinusoidal strain in alternating compression of +/−2%. The measurements are carried out at 60° C. and at a frequency of 10 Hz.

The results, presented in table V, are thus the compressive complex modulus (E*, 60° C., 10 Hz) and the loss factor (tan δ, 60° C., 10 Hz).

The values for the loss factor (tan δ) and for amplitude of dynamic shear elastic modulus (ΔG') are recorded on vulcanized samples (parallelepipedal test specimen with a cross section of 8 mm$^2$ and a height of 7 mm). The sample is subjected to a double alternating sinusoidal shear strain at a temperature of 40° C. and at a frequency of 10 Hz. The strain amplitude sweeping processes are carried out according to an outward-return cycle, proceeding outward from 0.1% to 50% and then returning from 50% to 0.1%.

The results, presented in table V, result from the return strain amplitude sweep and relate to the maximum value of the loss factor (tan δ max return, 40° C., 10 Hz) and to the amplitude of the elastic modulus (ΔG', 40° C., 10 Hz) between the values at 0.1% and 50% strain (Payne effect).

TABLE V

| Compositions | Control 1 | Composition 1 |
|---|---|---|
| E*, 60° C., 10 Hz (MPa) | 5.8 | 5.4 |
| Tan δ, 60° C., 10 Hz | 0.125 | 0.111 |
| ΔG', 40° C., 10 Hz (MPa) | 1.4 | 1.0 |
| Tan δ max return, 40° C., 10 Hz | 0.190 | 0.172 |

The use of a silica S1 of the present invention (Composition 1) makes it possible to improve the maximum value of the loss factor and the amplitude of the elastic modulus or Payne effect, with respect to the reference (Control 1).

The examination of the various tables II to V shows that the composition in accordance with the invention (Composition 1) makes it possible to obtain a good processing/reinforcement/hysteresis properties compromise, with respect to the control composition (Control 1), and in particular a sizable gain in raw viscosity, which remains stable on storage over time.

Example 3

The suspension of precipitated silica used is a silica slurry obtained on conclusion of the precipitation reaction during the process for the preparation of the Z1165MP silica.

The silica suspension (698 liters) is filtered and washed on a filter press and is then subjected to compacting at a pressure of 5.5 bar on the same filter. The silica cake which results therefrom exhibits a solids content of 23% by weight.

Prior to the liquefaction operation, a 100 g/l solution of an MGA mixture is prepared by dissolving the mixture of polycarboxylic acids (94.8% by weight of methylglutaric acid, 4.9% by weight of ethylsuccinic anhydride, 0.2% by weight of adipic acid and 0.1% of others) in water (35° C.) with stirring.

The cake obtained in the filtration stage is subjected to a liquefaction operation in a continuous vigorously stirred reactor (for 80 minutes) with simultaneous addition to the cake of 1135 grams of a sodium aluminate solution (Al/SiO$_2$ ratio by weight of 0.33%) and of 6044 grams of the MGA solution (MGA mixture/SiO$_2$ ratio by weight of 1.26%).

This disintegrated cake (having a solids content of 22% by weight) is subsequently dried using a nozzle atomizer by spraying the disintegrated cake through a 1.5 mm nozzle with a pressure of 25 bar under the following mean conditions of flow rate and of temperatures:

Mean inlet temperature: 540° C.

Mean outlet temperature: 153° C.

Mean flow rate: 207 l/h.

The characteristics of the silica S2 obtained (in the form of substantially spherical beads) are then the following:

| | |
|---|---|
| BET (m²/g) | 144 |
| Content of polycarboxylic acid + carboxylate (C) (%) | 0.53 |
| Aluminum (Al) content (%) | 0.29 |
| Ratio (R) | 1.4 |
| CTAB (m²/g) | 156 |
| $\gamma_s^d$ (mJ/m²) | 33.5 |
| Water uptake (%) | 8.5 |
| $\varnothing_{50}$ (μm) after deagglomeration with ultrasound | 2.8 |
| Fd after deagglomeration with ultrasound | 16.2 |
| V2/V1 (%) | 58 |
| pH | 5.4 |

Example 4 (Comparative)

The suspension of precipitated silica used is a silica cake (having a solid content of 23% by weight) obtained on conclusion of the filtration stage during the process for the preparation of the Z1165MP silica.

Prior to the liquefaction operation, a 100 g/l maleic acid solution is prepared by dissolving maleic acid in water (at 35° C.) with stirring.

The cake obtained in the filtration stage is subjected to a liquefaction operation in a continuous vigorously stirred reactor (for approximately 90 minutes) with addition to the cake of 4400 grams of the 100 g/l maleic acid solution (maleic acid/SiO₂ ratio by weight of 1.0%).

This disintegrated cake (having a solids content of 22% by weight) is subsequently dried using a nozzle atomizer by spraying the disintegrated cake through a 1.5 mm nozzle with a pressure of 25 bar under the following mean conditions of flow rate and of temperatures:

Mean inlet temperature: 577° C.

Mean outlet temperature: 157° C.

Mean flow rate: 220 l/h.

The characteristics of the silica C1 obtained (in the form of substantially spherical beads) are then the following:

| | |
|---|---|
| BET (m²/g) | 169 |
| Content of polycarboxylic acid + carboxylate (C) (%) | 0.19 |
| Aluminum (Al) content (%) | <0.05 |
| Ratio (R) | >4.3 |
| CTAB (m²/g) | 178 |
| $\gamma_s^d$ (mJ/m²) | 51 |
| $\varnothing_{50}$ (μm) after deagglomeration with ultrasound | 3.6 |
| Fd after deagglomeration with ultrasound | 19.3 |
| V2/V1 (%) | 58 |
| pH | 3.8 |

Example 5

The elastomeric compositions, the make up of which, expressed as parts by weight per 100 parts of elastomers (phr), is shown in table VI below, are prepared in an internal mixer of Brabender type (380 ml):

TABLE VI

| Composition | Control 2 | Composition 2 |
|---|---|---|
| SBR (1) | 103 | 103 |
| BR (1) | 25 | 25 |
| Silica 1 (2) | 80 | |
| Silica S2 (3) | | 80 |
| Coupling agent (4) | 6.4 | 6.4 |
| Carbon black (N330) | 3.0 | 3.0 |
| Plasticizer (5) | 7 | 7 |
| ZnO | 2.5 | 2.5 |
| Stearic acid | 2 | 2 |
| Antioxidant (6) | 1.9 | 1.9 |
| DPG (7) | 1.5 | 1.5 |
| CBS (8) | 2 | 2 |
| Sulfur | 1.1 | 1.1 |

(1) Solution SBR (Buna VSL5025-2 from Lanxess) with 50 +/− 4% of vinyl units; 25 +/− 2% of styrene units; Tg in the vicinity of −20° C.; 100 phr of SBR extended with 37.5 +/− 2.8% by weight of oil/BR (Buna CB 25 from Lanxess)
(2) Silica Z1165 MP from Rhodia
(3) Silica S2 according to the present invention (liquefaction with simultaneous addition of a mixture of MGA acids and of sodium aluminate (example 3 above))
(4) TESPT (Luvomaxx TESPT from Lehvoss France sarl)
(5) Nytex 4700 from Nynas
(6) N-(1,3-Dimethylbutyl)-N-phenyl-para-phenylenediamine (Santoflex 6-PPD from Flexsys)
(7) Diphenylguanidine (Rhenogran DPG-80 from RheinChemie)
(8) N-Cyclohexyl-2-benzothiazolesulfenamide (Rhenogran CBS-80 from RheinChemie)

Process for the Preparation of the Rubber Compositions:

The process for the preparation of the rubber compositions is carried out in two successive preparation phases. A first phase consists of a phase of high-temperature thermomechanical working. It is followed by a second phase of mechanical working at temperatures of less than 110° C. This phase makes possible the introduction of the vulcanization system.

The first phase is carried out using a mixing device, of internal mixer type, of Brabender brand (capacity of 380 ml). The filling coefficient is 0.6. The initial temperature and the speed of the rotors are set on each occasion so as to achieve mixture dropping temperatures of approximately 140-160° C.

Broken down here into two passes, the first phase makes it possible to incorporate, in a first pass, the elastomers and then the reinforcing filler (introduction in installments) with the coupling agent and the stearic acid. For this pass, the duration is between 4 and 10 minutes.

After cooling the mixture (temperature of less than 100° C.), a second pass makes it possible to incorporate the zinc oxide and the protecting agents/antioxidants (in particular 6-PPD). The duration of this pass is between 2 and 5 minutes.

After cooling the mixture (temperature of less than 100° C.), the second phase makes possible the introduction of the vulcanization system (sulfur and accelerators, such as CBS). It is carried out on an open mill, preheated to 50° C. The duration of this phase is between 2 and 6 minutes.

Each final mixture is subsequently calandered in the form of plaques with a thickness of 2-3 mm.

With regard to these "raw" mixtures obtained, an evaluation of their rheological properties makes it possible to optimize the vulcanization time and the vulcanization temperature.

Subsequently, the mechanical and dynamic properties of the mixtures vulcanized at the curing optimum (T98) are measured.

Rheological Properties

Viscosity of the Raw Mixtures:

The Mooney consistency is measured on the compositions in the raw state at 100° C. using an MV 2000 rheometer and also the determination of the Mooney stress-relaxation rate according to the standard NF ISO 289.

The value of the torque, read at the end of 4 minutes after preheating for one minute (Mooney Large (1+4)—at 100° C.), is shown in table VII. The test is carried out after preparing the raw mixtures and then after aging for 3 weeks at a temperature of 23+/−3° C.

TABLE VII

| Compositions | | Control 2 | Composition 2 |
|---|---|---|---|
| ML (1 + 4) - 100° C. | Initial | 79 | 71 |
| Mooney relaxation | Initial | 0.312 | 0.324 |
| ML (1 + 4) - 100° C. | After 3 weeks (23 +/− 3° C.) | 93 | 76 |
| Mooney relaxation | After 3 weeks (23 +/− 3° C.) | 0.258 | 0.324 |

It is found that the silica S2 of the present invention (Composition 2) makes possible a sizable reduction in the initial raw viscosity, with respect to the control mixture.

It is also found that the silica S2 of the present invention (Composition 2) makes it possible to retain the advantage in reduced raw viscosity after 3 weeks of storage, with respect to the control mixture, and to obtain a satisfactory Mooney relaxation, mainly over time.

This type of behavior is of great use to a person skilled in the art in the case of the processing of a silica-comprising rubber mixture.

Rheometry of the Compositions:

The measurements are carried out on the compositions in the raw state. The results relating to the rheology test, which is carried out at 160° C. using a Monsanto ODR rheometer according to the standard NF ISO 3417, have been given in table VIII.

According to this test, the test composition is placed in the test chamber regulated at the temperature of 160° C. for 30 minutes, and the resistive torque opposed by the composition to a low-amplitude (3°) oscillation of a biconical rotor included in the test chamber is measured, the composition completely filling the chamber under consideration.

The following are determined from the curve of variation in the torque as a function of time:
- the minimum torque (Tmin), which reflects the viscosity of the composition at the temperature under consideration;
- the maximum torque (Tmax);
- the delta torque ($\Delta T=Tmax-Tmin$), which reflects the degree of crosslinking brought about by the action of the crosslinking system and, if the need arises, of the coupling agents;
- the time T98 necessary to obtain a vulcanization state corresponding to 98% of complete vulcanization (this time is taken as vulcanization optimum);
- and the scorch time TS2, corresponding to the time necessary in order to have a rise of 2 points above the minimum torque at the temperature under consideration (160° C.) and which reflects the time during which it is possible to process the raw mixtures at this temperature without having initiation of vulcanization (the mixture cures from TS2).

The results obtained are shown in table VIII.

TABLE VIII

| Compositions | Control 2 | Composition 2 |
|---|---|---|
| Tmin (dN · m) | 17.0 | 14.9 |
| Tmax (dN · m) | 56.0 | 65.6 |
| Delta torque (dN · m) | 39.0 | 50.7 |
| TS2 (min) | 5.8 | 9.0 |
| T98 (min) | 26.2 | 26.6 |

It is found that the composition resulting from the invention (Composition 2) exhibits a satisfactory combination of rheological properties.

In particular, while having a reduced raw viscosity, it exhibits a lower minimum torque value and a higher maximum torque value than those of the control mixture, which reflects a greater processability of the prepared mixture.

The use of the silica S2 of the present invention (Composition 2) thus makes it possible to reduce the minimum viscosity (lower minimum torque Tmin, which is a sign of an improvement in the raw viscosity) with respect to the control mixture without damaging the vulcanization behavior.

Mechanical Properties of the Vulcanisates:

The measurements are carried out on the optimally vulcanized compositions (T98) for a temperature of 160° C.

Uniaxial tensile tests are carried out in accordance with the instructions of the standard NF ISO 37 with test specimens of H2 type at a rate of 500 mm/min on an Instron 5564 device. The x % moduli, corresponding to the stress measured at x % of tensile strain, are expressed in MPa. It is possible to determine a reinforcing index (RI) which is equal to the ratio of the modulus at 300% strain to the modulus at 100% strain.

The Shore A hardness measurement on the vulcanisates is carried out according to the instructions of the standard ASTM D 2240. The given value is measured at 15 seconds.

The properties measured are collated in table IX.

TABLE IX

| Compositions | Control 2 | Composition 2 |
|---|---|---|
| 10% Modulus (MPa) | 0.6 | 0.6 |
| 100% Modulus (MPa) | 2.1 | 2.3 |
| 300% Modulus (MPa) | 11.6 | 13.6 |
| RI | 5.6 | 5.9 |
| Shore A hardness - 15 s (pts) | 55 | 55 |

It is found that the composition resulting from the invention (Composition 2) exhibits a good compromise in mechanical properties, with respect to what is obtained with the control mixture.

Composition 2 thus exhibits relatively low 10% and 100% moduli and a high 300% modulus, hence a greater reinforcing index.

The use of a silica S2 of the present invention (Composition 2) makes it possible to obtain a satisfactory level of reinforcement, with respect to the control mixture.

Dynamic Properties of the Vulcanisates:

The dynamic properties are measured on a viscosity analyser (Metravib VA3000) according to the standard ASTM D5992.

The values for loss factor (tan δ) and compressive dynamic complex modulus (E*) are recorded on vulcanized samples (cylindrical test specimen with a cross section of 95 mm$^2$ and a height of 14 mm). The sample is subjected at the start to a 10% prestrain and then to a sinusoidal strain in alternating compression of plus or minus 2%. The measurements are carried out at 60° C. and at a frequency of 10 Hz.

The results, presented in table X, are the compressive complex modulus (E*, 60° C., 10 Hz) and the loss factor (tan δ, 60° C., 10 Hz).

The values for the loss factor (tan δ) and for amplitude of dynamic shear elastic modulus (ΔG') are recorded on vulcanized samples (parallelepipedal test specimen with a cross section of 8 mm² and a height of 7 mm). The sample is subjected to a double alternating sinusoidal shear strain at a temperature of 40° C. and at a frequency of 10 Hz. The strain amplitude sweeping processes are carried out according to an outward-return cycle, proceeding outward from 0.1% to 50% and then returning from 50% to 0.1%.

The results, presented in table X, result from the return strain amplitude sweep and relate to the maximum value of the loss factor (tan δ max return, 40° C., 10 Hz) and to the amplitude of the elastic modulus (ΔG', 40° C., 10 Hz) between the values at 0.1% and 50% strain (Payne effect).

TABLE X

| Compositions | Control 2 | Composition 2 |
|---|---|---|
| E*, 60° C., 10 Hz (MPa) | 5.8 | 5.7 |
| Tan δ, 60° C., 10 Hz | 0.125 | 0.108 |
| ΔG', 40° C., 10 Hz (MPa) | 1.4 | 1.5 |
| Tan δ max return, 40° C., 10 Hz | 0.190 | 0.187 |

The use of a silica S2 of the present invention (Composition 3) makes it possible to improve the maximum value of the loss factor at 60° C. while keeping the amplitude of the elastic modulus constant (or Payne effect) at the level of that of the control mixture.

The examination of the various tables VII to X shows that the composition in accordance with the invention (Composition 2) makes it possible to obtain a good processing/reinforcement/hysteresis properties compromise, with respect to the control mixture, in particular with a gain in raw viscosity which remains substantially stable on storage over time.

Example 6

The elastomeric compositions, the make up of which, expressed as parts by weight per 100 parts of elastomers (phr), is shown in table XI below, are prepared in an internal mixer of Brabender type (380 ml):

TABLE XI

| Composition | Control 3 | Control 4 | Composition 3 |
|---|---|---|---|
| NR (1) | 100 | 100 | 100 |
| Silica 1 (2) | 55 | | |
| Silica C1 (3) | | 55 | |
| Silica S2 (4) | | | 55 |
| Coupling agent (5) | 4.4 | 4.4 | 4.4 |
| ZnO | 3 | 3 | 3 |
| Stearic acid | 4 | 4 | 4 |
| Antioxidant 1 (6) | 1.5 | 1.5 | 1.5 |
| Antioxidant 2 (7) | 1.0 | 1.0 | 1.0 |
| Carbon black (N330) | 3.0 | 3.0 | 3.0 |

TABLE XI-continued

| Composition | Control 3 | Control 4 | Composition 3 |
|---|---|---|---|
| CBS (8) | 1.7 | 1.7 | 1.7 |
| Sulfur | 1.5 | 1.5 | 1.5 |

(1) Natural rubber CVR CV60 (supplied by Safic-Alcan)
(2) Silica Z1165MP from Rhodia
(3) Silica C1 (liquefaction with addition of maleic acid (example 4, comparative))
(4) Silica S2 according to the present invention (liquefaction with simultaneous addition of a mixture of MGA acids and of sodium aluminate (example 3 above))
(5) TESPT (Luvomaxx TESPT from Lehvoss France sarl)
(6) N-(1,3-Dimethylbutyl)-N-phenyl-para-phenylenediamine (Santoflex 6-PPD from Flexsys)
(7) 2,2,4-Trimethyl-1H-quinoline (Permanax TQ from Flexsys)
(8) N-Cyclohexyl-2-benzothiazolesulfenamide (Rhenogran CBS-80 from RheinChemie)

Process for the Preparation of the Rubber Compositions:

The process for the preparation of the rubber compositions is carried out in two successive preparation phases. A first phase consists of a phase of high-temperature thermomechanical working. It is followed by a second phase of mechanical working at temperatures of less than 110° C. This phase makes possible the introduction of the vulcanization system.

The first phase is carried out using a mixing device, of internal mixer type, of Brabender brand (capacity of 380 ml). The filling coefficient is 0.6. The initial temperature (90° C.) and the speed of the rotors (80 rev/min) are set on each occasion so as to achieve mixture dropping temperatures of approximately 140-160° C.

Broken down here into two passes, the first phase makes it possible to incorporate, in a first pass, the elastomers and then the reinforcing filler (introduction in installments) with the coupling agent and the stearic acid. For this pass (speed of the rotors of 90 rev/min and temperature of 100° C.), the duration is between 4 and 10 minutes After cooling the mixture (temperature of less than 100° C.), a second pass makes it possible to incorporate the zinc oxide and the protecting agents/antioxidants (in particular 6-PPD). The duration of this pass is between 2 and 5 minutes.

After cooling the mixture (temperature of less than 100° C.), the second phase makes possible the introduction of the vulcanization system (sulfur and accelerators, such as CBS). It is carried out on an open mill, preheated to 50° C. The duration of this phase is between 2 and 6 minutes.

Each final mixture is subsequently calandered in the form of plaques with a thickness of 2-3 mm.

With regard to these "raw" mixtures, an evaluation of their rheological properties makes it possible to optimize the vulcanization time and the vulcanization temperature.

Subsequently, the mechanical and dynamic properties of the mixtures vulcanized at the curing optimum (T98) are measured.

Rheological Properties

Viscosity of the Raw Mixtures:

The Mooney consistency is measured on the compositions in the raw state at 100° C. using an MV 2000 rheometer and also the determination of the Mooney stress-relaxation rate according to the standard NF ISO 289.

The value of the torque, read at the end of 4 minutes after preheating for one minute (Mooney Large (1+4)—at 100° C.), is shown in table XII. The test is carried out after preparing the raw mixtures and then after aging for 10 days at a temperature of 23+/−3° C.

TABLE XII

| Compositions | | Control 3 | Control 4 | Composition 3 |
|---|---|---|---|---|
| ML (1 + 4) - 100° C. | Initial | 59 | 56 | 53 |
| Mooney relaxation | Initial | 0.392 | 0.385 | 0.418 |
| ML (1 + 4) - 100° C. | After 11 days (23 +/- 3° C.) | 65 | 59 | 56 |
| Mooney relaxation | After 11 days (23 +/- 3° C.) | 0.380 | 0.399 | 0.445 |

It is found that the silica S2 of the present invention (Composition 3) makes possible a reduction in the initial raw viscosity, with respect to the control mixture 3 and the control mixture 4.

It is also found that the silica S2 of the present invention (Composition 3) shows an enhanced performance in terms of reduction in the raw viscosity, with respect to the control mixture 3 and the control mixture 4.

It is also observed that the use of the silica S2 of the present invention (Composition 3) makes it possible to retain the advantage in reduced raw viscosity, with respect to the control mixture, after 11 days of storage.

This type of behavior is of great use to a person skilled in the art in the case of the processing of a silica-comprising rubber mixture.

Rheometry of the Compositions:

The measurements are carried out on the compositions in the raw state. The results relating to the rheology test, which is carried out at 150° C. using a Monsanto ODR rheometer according to the standard NF ISO 3417, have been given in table XIII.

According to this test, the test composition is placed in the test chamber regulated at the temperature of 150° C. for 30 minutes, and the resistive torque opposed by the composition to a low-amplitude (3°) oscillation of a biconical rotor included in the test chamber is measured, the composition completely filling the chamber under consideration.

The following are determined from the curve of variation in the torque as a function of time:
- the minimum torque (Tmin), which reflects the viscosity of the composition at the temperature under consideration;
- the maximum torque (Tmax);
- the delta torque ($\Delta T = T_{max} - T_{min}$), which reflects the degree of crosslinking brought about by the action of the crosslinking system and, if the need arises, of the coupling agents;
- the time T98 necessary to obtain a vulcanization state corresponding to 98% of complete vulcanization (this time is taken as vulcanization optimum).

The results obtained are shown in table XIII.

TABLE XIII

| Compositions | Control 3 | Control 4 | Composition 3 |
|---|---|---|---|
| Tmin (dN · m) | 13.6 | 13.5 | 11.1 |
| Tmax (dN · m) | 71.6 | 69.4 | 82.9 |
| Delta torque (dN · m) | 58 | 56 | 72 |
| T98 (min) | 25.2 | 26.9 | 23.6 |

It is found that the composition resulting from the invention (Composition 3) exhibits a satisfactory combination of rheological properties.

In particular, while having a reduced raw viscosity, it exhibits a lower minimum torque value and a higher maximum torque value than those of the control mixture 3 and the control mixture 4, which reflects a greater processability of the prepared mixture.

The use of the silica S2 of the present invention (Composition 3) makes it possible to reduce the minimum viscosity (low minimum torque Tmin, which is a sign of an improvement in the raw viscosity) with respect to the control mixture 3 and the control mixture 4 without damaging the vulcanization behavior.

Mechanical Properties of the Vulcanisates:

The measurements are carried out on the optimally vulcanized compositions (T98) for a temperature of 150° C.

Uniaxial tensile tests are carried out in accordance with the instructions of the standard NF ISO 37 with test specimens of H2 type at a rate of 500 mm/min on an Instron 5564 device. The x % moduli, corresponding to the stress measured at x % of tensile strain, and the ultimate strength are expressed in MPa; the elongation at break is expressed in %.

The Shore A hardness measurement on the vulcanisates is carried out according to the instructions of the standard ASTM D 2240. The given value is measured at 15 seconds.

The properties measured are collated in table XIV.

TABLE XIV

| Compositions | Control 3 | Control 4 | Composition 3 |
|---|---|---|---|
| 10% Modulus (MPa) | 0.6 | 0.5 | 0.7 |
| 300% Modulus (MPa) | 12.3 | 12.6 | 15.0 |
| Ultimate strength (MPa) | 26.0 | 26.8 | 30.5 |
| Elongation at break (%) | 532 | 521 | 548 |
| Shore A hardness - 15 s (pts) | 59 | 55 | 64 |

It is found that the composition resulting from the invention (Composition 3) exhibits a satisfactory compromise in mechanical properties, with respect to what is obtained with the control mixture 3 and with the control mixture 4.

Composition 3 thus exhibits a relatively low 10% modulus and a relatively high 300% modulus.

The use of a silica S2 of the present invention (Composition 3) makes it possible to retain substantially the same level of reinforcement while achieving a 300% modulus, a higher ultimate strength, a higher elongation at break and a higher Shore A hardness, with respect to the control mixture 3 and the control mixture 4.

Dynamic Properties of the Vulcanisates:

The dynamic properties are measured on a viscosity analyser (Metravib VA3000) according to the standard ASTM D5992.

The values for loss factor (tan $\delta$) and compressive dynamic complex modulus (E*) are recorded on vulcanized samples (cylindrical test specimen with a cross section of 95 mm$^2$ and a height of 14 mm). The sample is subjected at the start to a 10% prestrain and then to a sinusoidal strain in alternating compression of plus or minus 2%. The measurements are carried out at 60° C. and at a frequency of 10 Hz.

The results, presented in table XV, are the compressive complex modulus (E*, 60° C., 10 Hz) and the loss factor (tan $\delta$, 60° C., 10 Hz).

The values for the loss factor (tan $\delta$) are recorded on vulcanized samples (parallelepipedal test specimen with a cross section of 8 mm$^2$ and a height of 7 mm). The sample is subjected to a double alternating sinusoidal shear strain at a temperature of 60° C. and at a frequency of 10 Hz. The strain amplitude sweeping processes are carried out according to an outward-return cycle, proceeding outward from 0.1% to 50% and then returning from 50% to 0.1%.

The results, presented in table XV, result from the return strain amplitude sweep and relate to the maximum value of the loss factor (tan δ max return, 60° C., 10 Hz).

TABLE XV

| Compositions | Control 3 | Control 4 | Composition 3 |
|---|---|---|---|
| E*, 60° C., 10 Hz (MPa) | 6.5 | 5.6 | 7.9 |
| Tan δ, 60° C., 10 Hz | 0.125 | 0.118 | 0.098 |
| Tan δ max return, 60° C., 10 Hz | 0.138 | 0.135 | 0.134 |

The use of a silica S2 of the present invention (Composition 3) makes it possible to improve the maximum value of the loss factor, with respect to the control mixture 3 and the control mixture 4.

The examination of the various tables XII to XV shows that the composition in accordance with the invention (Composition 3) makes it possible to obtain a good processing/reinforcement/hysteresis properties compromise at 60° C., with respect to the control mixture 3 and the control mixture 4, in particular with a gain in raw viscosity which remains substantially stable on storage over time.

The invention claimed is:

1. A precipitated silica having:
   a BET specific surface of between 45 and 550 $m^2/g$,
   a content (C) of polycarboxylic acid and corresponding carboxylate, expressed as total carbon, of at least 0.15% by weight, and
   an aluminum (Al) content of at least 0.20% by weight;
   wherein the polycarboxylic acid comprises a mixture of polycarboxylic acids comprising at least one of ethylsuccinic acid, glutaric acid and methylglutaric acid.

2. The precipitated silica as claimed in claim 1, wherein the mixture of polycarboxylic acids further comprises adipic acid, succinic acid, oxalic acid, citric acid or a mixture thereof.

3. A polymer composition comprising a precipitated silica as claimed in claim 1.

4. The precipitated silica as claimed in claim 1, wherein the mixture of polycarboxylic acids comprises the following acids: adipic acid, glutaric acid and succinic acid.

5. The precipitated silica as claimed in claim 4, wherein the mixture of polycarboxylic acids comprises from 15% to 35% by weight of adipic acid, from 40% to 60% by weight of glutaric acid and from 15% to 25% by weight of succinic acid.

6. The precipitated silica as claimed in claim 1, wherein the mixture of polycarboxylic acids comprises the following acids: methylglutaric acid, ethylsuccinic acid and adipic acid.

7. The precipitated silica as claimed in claim 6, wherein the mixture of polycarboxylic acids comprises from 60% to 96% by weight of methylglutaric acid, from 3.9% to 20% by weight of ethylsuccinic acid and from 0.05% to 20% by weight of adipic acid.

8. An article comprising at least one polymer composition as claimed in claim 3, this article consisting of a footwear sole, a floor covering, a gas barrier, a flame-retardant material, a roller for cableways, a seal for domestic electrical appliances, a seal for liquid or gas pipes, a braking system seal, a pipe, a sheathing, a cable, an engine support, a battery separator, a conveyor belt, a transmission belt or a tire.

9. A process for the preparation of a precipitated silica as claimed in claim 1, the process comprising:
   reacting at least one silicate with at least one acidifying agent, so as to obtain a suspension of precipitated silica,
   filtering said suspension of precipitated silica, so as to obtain a filtration cake,
   subjecting said filtration cake to a liquefaction operation comprising the addition of an aluminum compound, and
   optionally drying the filtration cake after the liquefaction operation, wherein a mixture of polycarboxylic acids comprising at least one of ethylsuccinic acid, glutaric acid and methylglutaric acid is added to the filtration cake, during or after the liquefaction operation.

10. The process as claimed in claim 9, wherein the mixture of polycarboxylic acids and the aluminum compound are simultaneously added to the filtration cake during the liquefaction operation.

11. The process as claimed in claim 9, wherein the aluminum compound is added to the filtration cake during the liquefaction operation prior to the addition of the mixture of polycarboxylic acids.

12. The process as claimed in claim 9, wherein the mixture of polycarboxylic acids is added to the filtration cake after the liquefaction operation.

13. The process as claimed in claim 9, wherein the mixture of polycarboxylic acids comprises the following acids: adipic acid, glutaric acid and succinic acid.

14. The process as claimed in claim 13, wherein the mixture of polycarboxylic acids comprises from 15% to 35% by weight of adipic acid, from 40% to 60% by weight of glutaric acid and from 15% to 25% by weight of succinic acid.

15. The process as claimed in claim 9, wherein the mixture of polycarboxylic acids comprises the following acids: methylglutaric acid, ethylsuccinic acid and adipic acid.

16. The process as claimed in claim 15, wherein the mixture of polycarboxylic acids comprises from 60% to 96% by weight of methylglutaric acid, from 3.9% to 20% by weight of ethylsuccinic acid and from 0.05% to 20% by weight of adipic acid.

17. The process as claimed in claim 9, wherein a portion or all of the polycarboxylic acids are in the anhydride, ester, alkali metal salt (carboxylate) or ammonium salt (carboxylate) form.

18. The process as claimed in claim 17, wherein the mixture of polycarboxylic acids is a mixture comprising:
   methylglutaric acid in a proportion of 60% to 96% by weight,
   ethylsuccinic anhydride in a proportion of 3.9% to 20% by weight, and
   adipic acid in a proportion of 0.05% to 20% by weight.

19. The process as claimed in claim 17, wherein the mixture of polycarboxylic acids is a mixture comprising:
   methylglutaric acid in a proportion of 10% to 50% by weight,
   methylglutaric anhydride in a proportion of 40% to 80% by weight,
   ethylsuccinic anhydride in a proportion of 3.9% to 20% by weight, and
   adipic acid in a proportion of 0.05% to 20% by weight.

20. The process as claimed in claim 9, wherein the aluminum compound is an alkali metal aluminate.

21. The process as claimed in claim 9, wherein the step of reacting at least one silicate with at least one acidifying agent comprises:
   (i) forming an initial vessel heel comprising at least a portion of the total amount of the silicate involved in the reaction and an electrolyte, the concentration of silicate (expressed as $SiO_2$) in said initial vessel heel being less than 100 g/l,
(ii) adding the acidifying agent to said vessel heel until a value for the pH of the reaction medium of at least 7.0 is obtained, and
(iii) adding additional acidifying agent and, if appropriate, simultaneously adding the remaining amount of silicate to the reaction medium, wherein the mixture of polycarboxylic acids is added to the filtration cake, either during the liquefaction operation, or after the liquefaction operation and before the drying stage.

* * * * *